3,412,184
PROCESS FOR THE PREPARATION OF CELLU-
LOSIC ESTER REVERSE OSMOSIS MEMBRANES
Allan Sharples and William Banks, Edinburgh, Scotland,
 assignors, by direct and mesne assignments, of one-half
 each to Arthur D. Little Research Institute, Inveresk,
 Midlothian, Scotland, and the United States of America
 as represented by the Secretary of the Interior
No Drawing. Filed Feb. 17, 1966, Ser. No. 536,172
7 Claims. (Cl. 264—49)

ABSTRACT OF THE DISCLOSURE

A method for preparing reverse osmosis membranes is presented. The procedure involves; casting a thin film from a mixture comprising cellulosic ester and casting solvent, removing a portion of the casting solvent from the film, and contacting the film with a liquid comprising an organic leaching solvent which is miscible with the casting solvent to remove leachable components in the film. The casting solvent may be acetone and the leaching solvent may be methanol.

The invention can be illustrated by the following diagram:

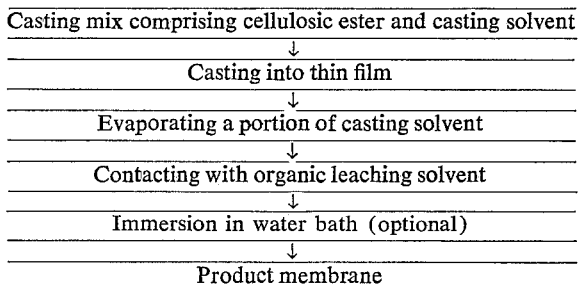

This invention relates ot reverse osmosis membranes used for demineralization of aqueous solutions, such as sea water. In particular the membranes are prepared by a novel method in which cellulosic ester polymer is cast from a mixture of the ester, an organic solvent, and a suitable additive for swelling the ester membrane; subsequently the organic solvent is evaporated from the membrane surface and the cast membrane is immersed in a non-aqueous organic leaching solvent, such as methanol, to dissolve the remaining organic casting solvent and swelling agent from the cast membrane.

The reverse osmosis process has attracted considerable interest in the purification of sea water and brackish salt waters. Also, the process is applicable in separating water from an aqueous solution with concurrent concentration of the feed stream. In the reverse osmosis demineralization process, a pressure in excess of the osmotic pressure of the feed solution is applied to a solution separated from a purified water reservoir by a semipermeable membrane. The direction of water flow observed in the classic osmotic experiment is reversed, and solute removal is effected.

A large number of materials have been discovered been discovered which are capable of removing at least a portion of solute molecules from an aqueous solvent by the reverse osmosis process. The most successful of the membrane materials has been the cellulosic esters, such as cellulose acetate. This material demineralizes water at a relatively high permeation flux rate while achieving a high degree of solute rejection (of the order of 98% or better is commonplace). For this reason cellulose acetate has received considerable attention by workers in the field and a number of successful processes have been developed for preparing the semipermeable film necessary for an economical desalination plant. Early reports of the reverse osmotic phenomenon by Reid et al. in J. Appl. Poly. Sci., vol. 1, page 133 (1959); vol. 2, page 264 (1959); and vol. 4, page 354 (1960), led others to seek development of better semipermeable osmotic films for high salt rejection and correspondingly-high throughput or permeation flux rate for water. A significant advance in the desalination arts was realized when Loeb et al. cast porous cellulose acetate membranes from a casting solution comprising a film-forming cellulosic ester and an aqueous solution of magnesium perchlorate in an organic solvent, such as acetone. The methods for membrane preparation and for their use in a reverse osmosis process are described in U.S. Patents 3,133,132 and 3,133,137, issued May 12, 1964.

Numerous compositions and methods for casting cellulose acetate membranes have been described. Some of these appear in reports of the Office of Saline Water in Research and Development Progress Report No. 84 (November 1963), R & D Report No. 111 (May 1965), and R & D Report No. 117 (November 1965); and in Chemical Engineering, Aug. 2, 1965, page 62.

Methods for preparing successful cellulose acetate reverse osmosis demineralization membranes include the following steps:

(1) Casting a thin film of the cellulosic ester from a casting mixture containing the ester polymer, which has an acyl content of about 38 to 41 weight percent, and an organic solvent. If a non-swelling solvent such as acetone is used to dissolve the polymer, a swelling agent or additive has been found to be necessary to render the substrate portions of the film sufficiently porous. Such additives include aqueous or alcohol soluitons of electrolyte salts, including magnesium perchlorate, zinc halides or mixtures of these. Loeb et al. have reported the use of non-aqueous ternary casting compositions containing the polymer, acetone solvent and a swelling agent, such as formamide, dimethylformamide, dimethyl-sulfoxide, tetrahydrofurfuryl-phosphate, triethyl-phosphate, acetic acid, or N-methyl-2-pyrrolidone. Also, quaternary solutions consisting of polymer, acetone, water and additives, such as urea, glyoxal or hydrogen peroxide have been used for casting reverse osmosis films. Swelling-type solvents for the polymer have also been used to prepare porous films. These include the binary casting compositions containing acetic acid, dimethylformamide or triethylphosphate as the solvent for the cellulose acetate polymer.

(2) The next step in the procedure is removing a portion of the solvent from a surface of the cast film by a diffusion process such as evaporation, resulting in an "active layer" which is attributed with the desalination characteristics of the film. This is an essential step, and its requirements establish the volatility properties of the solvent.

(3) The third essential step is leaching the solvent and additives from the cast film and this creates the porous substrate adjacent to the "active layer" of the film. In the prior art processes a water bath has been used in the leaching step to remove casting solvent, such as acetone, and swelling additives, such as aqueous perchlorate or formamide from the membrane. It has been discovered that non-aqueous organic solvents can be used successfully in the leaching step as a substitute for the water bath used formerly. In particular, methanol has been found to be desirable as a leaching solvent for removing the casting solvent and additives from the cast film.

(4) A heating step is necessary in many processes for manufacturing cellulose acetate reverse osmosis membranes in which step the leached membrane is contacted for a few minutes with hot water in the temperature range of about 65 to 100° C. However, this is not essential for all compositions. Sharples and Banks have found that subsequent heating does not improve the desalination properties of a quaternary casting mixture of cellulose acetate, acetone, water and phenol. Also, Loeb et al. have prepared binary casting compositions using glacial acetic acid and cellulose acetate which resulted in membranes which required no heating step. This step is recited in the examples following, but is not necessary to the successful preparation of membranes in all cases.

Accordingly, it is an object of this invention to provide methods for preparing reverse osmosis demineralization membranes by casting a thin film of a cellulosic ester polymer from a casting mixture comprising a diffusible organic casting solvent, removing a portion of the casting solvent from the film surface, and contacting the film with an organic liquid leaching solvent, such as methanol, to remove casting solvent and/or swelling additives from the film. It is a further object of this invention to provide a method for preparing such membranes employing acetone casting solvent for cellulose acetate with a swelling additive such as aqueous or alcoholic magnesium perchlorate comprising the steps of casting a film from the mixture, evaporating a portion of the acetone, leaching the acetone and additive with methanol at a low temperature, and heating the cast film in water. These and other objects and features of the present invention will become apparent from the following description and examples of the invention.

CONTROL MEMBRANE

A reverse osmosis membrane was prepared using the method of Loeb et al. The casting dope was prepared by mixing 22.2 grams cellulose acetate (Eastman 39.8% acetyl content), 66.8 gm. acetone, 10.0 gm. water, and 1.0 gm. anhydrous magnesium perchlorate. A film 0.010 inch in thickness is cast on a glass plate at −8° C., and the solvent is permitted to evaporate for a period of four minutes at that temperature. The film is then immersed in cold water at about 0 to 2° C. for at least 2 hours. The final desalination properties are effected by heating the membrane in water for 15 minutes at 80° C.

A membrane prepared in the above manner was tested in a standard reverse osmosis cell using a feed solution of aqueous 3.5 wt. percent NaCl (synthetic sea water) at an input pressure of 1,500 p.s.i. A water permeation rate of 98 m./hour was obtained and the salt rejection was 98% for the control membrane.

Example 1

A membrane was prepared from the same casting solution by the identical procedure as in the control run, except that the immersion of the membrane after evaporation in a non-aqueous bath of methanol at a temperature of 0–2° C. for about 2 hours or more.

When tested in the standard cell under the controlled conditions above the flow of water was 95 ml./hour at a salt rejection of 98%. The flux density for this membrane was 1.19 ml./cm.$^2$-hr.

Example 2

A membrane was prepared in the same manner as in Example 1 except that the casting dope containing 10.0 gm. methanol in place of water on a weight-for-weight basis.

The standard test for desalination gave a flow rate of 100 ml./hour and a salt rejection of 97%. The flux density was 1.25 ml./cm.$^2$-hr.

Since the casting composition employed in these examples require a heating step to develop the usual desalination characteristics, a standard water bath followed the methanol leaching step. In transferring the leached film from the organic medium to the water bath, one desirable procedure is to replace the pure methane progressively with solutions of methanol and water having weight ratios of 80:20, 60:40, and 20:80 parts, respectively. An alternative method would be to remove the methanol from the membrane by immersion in an aqueous bath for about 5 minutes prior to heating. The same heating conditions of 80° C. and 5 minutes were employed for the methanol-leached membranes as for the control membrane.

The performances for the three membranes were substantially identical, and the use of a non-aqueous organic leach solvent is considered a major improvement in the preparation of reverse osmosis, since it opens the way for a wider variety of casting solvents and/or swelling additives. Additionally, the membrane can be stored in the non-aqueous leach solvent, thus removing the possibility of microbial attack.

Under the prior art processes, the selection of solvents for the cellulosic ester polymers and for the swelling additive was limited by the use of water as the leaching solvent; only those solvents and additives which were water-miscible were operable in the process.

The preferred organic solvents for use in the immersion leaching step are low-viscosity, low molecular weight alcohols having a single hydroxyl unit, such as methanol, ethanol, propanol, etc.; however, dihydric solvents (e.g., ethylene glycol) or trihydric solvents (e.g., glycerine) may be used. The important property of the leaching solvent is the ability to dissolve the casting composition solvent and additives without substantially affecting the polymer structure developed during the casting and evaporating steps. It may not be necessary to use alcohols during the immersion step if the film is one which requires heating in order to develop the necessary desalination properties, and provided that the heating takes place in a medium containing hydroxyl radicals, as in water or methanol.

Mixtures of organic leaching solvents, such as mixed alcohols, or solutions of alcohols with water or other organic liquids may be feasible in the present invention. The temperature for leaching the cast reverse osmosis films will vary considerably using different casting dopes, evaporation times or other process variables. Immersion is not the only method contemplated for leaching the films. For instance, the cast membranes may be suspended in a liquid spray of the leaching solvent.

Some of the conclusions to be reached as a result of the experimentation in non-aqueous procedures contradict the accepted theories of membrane formation. For instance, Manjikian has stated in Report No. 65–13 of the University of California at Los Angeles, entitled "Semipermeable Desalination Membranes from Organic Casting Solutions," page 10, March 1965, that in the use of water in the membrane fabrication process at the stage where the cast film is immersed in water, the role of water is specific and important, maintaining that water diffuses into the membrane and replaces other compounds and becomes a permanent structural component of the membrane. Obviously, the exclusion of water from the membrane in Example 2 must alter this theory somewhat. The exact role of alcohol in the method of this invention is not known; but, it is believed that methanol swells the cellulose acetate while being miscible with acetone and dissolving magnesium perchlorate. It is postulated that either the leaching solvent or the heating medium, where necessary, will impart the necessary desalination properties to the film.

The use of an organic leaching medium in the preparation of reverse osmosis membranes has decided advantages over water. A much wider variety of casting solvents for cellulosic ester may be used, since organic leaching solvents are available that will be miscible with most solvents for cellulosic ester polymers. Also, in casting dopes containing swelling additives, the organic leaching agent provides a much broader spectrum for selecting desirable additives. Under present technology only watersoluble catsing solvents and additives are used by necessity.

Cellulose acetate has been the most common membrane material used by the prior art workers and is the preferred embodiment of this invention; however, the acetyl group may be substituted by a suitable acyl radical, such as formyl, propionyl, butyryl, etc. The invention has been illustrated by specific examples but there is no intent to limit the invention to the specific details so disclosed, except insofar as set forth in the following claims.

What is claimed is:

1. A method for preparing reverse osmosis demineralization membrane comprising casting a thin film from a mixture comprising cellulosic ester polymer and casting solvent;

removing a portion of the casting solvent from the film; and contacting the film with a liquid comprising an organic leaching solvent which is miscible with the casting solvent to remove leachable components in the film.

2. The method of claim 1 wherein the leaching solvent comprises alcohol.

3. The method of claim 2 wherein the alcohol is methanol.

4. A method for preparing a reverse osmosis demineralization membrane comprising casting a thin film from a casting solution comprising cellulose acetate, acetone, and a swelling agent;

evaporating acetone from the film; and contacting the film with alcohol for a period of time sufficient to leach the swelling agent and remaining acetone from the film; and heating the film in aqueous environment.

5. The method of claim 4 wherein the alcohol is methanol.

6. The method of claim 5 wherein the film is immersed in a methanol bath at about 0 to 2° C. for at least about 2 hours.

7. The method of claim 6 wherein the swelling agent comprises magnesium perchlorate.

References Cited

U.S. Office of Saline Water, "The Mechanism of Desalination by Reverse Osmosis, and its Relation to Membrane Structure," research and development Report No. 143, June 1965, pp. 19–25.

JULIUS FROME, *Primary Examiner.*

P. E. ANDERSON, *Assistant Examiner.*